United States Patent [19]

Olstad et al.

[11] Patent Number: 5,476,096

[45] Date of Patent: Dec. 19, 1995

[54] ANALYSIS AND MEASUREMENT OF TEMPORAL TISSUE VARIATIONS

[75] Inventors: Bjørn Olstad, Ranheim; Torbjørn Bakke, Horten, both of Norway

[73] Assignee: Vingmed Sound A/S, Horten, Norway

[21] Appl. No.: 372,117

[22] Filed: Jan. 13, 1995

[30] Foreign Application Priority Data

Feb. 9, 1994 [NO] Norway .................................... 943269

[51] Int. Cl.⁶ ...................................................... A61B 8/00
[52] U.S. Cl. ..................................... 128/660.07; 128/916
[58] Field of Search ......................... 128/660.07, 660.08, 128/660.09, 661.01, 661.04, 661.10, 916; 73/861.25

[56] References Cited

U.S. PATENT DOCUMENTS

| Re. 34,566 | 3/1994 | Ledley | 128/916 |
|---|---|---|---|
| 5,195,521 | 3/1993 | Melton, Jr. et al. | |
| 5,329,929 | 7/1994 | Sato et al. | 128/916 |
| 5,379,769 | 1/1995 | Ito et al. | 128/660.07 |

OTHER PUBLICATIONS

Perona, et al., "Scale–Space and Edge Detection Using Anisotropic Diffusion" *IEEE Transactions on Pattern Analysis and Machine Intelligence*, vol. 12, No. 7, Jul. 1990.

Steen, et al., "Scale–Space and Boundary Detection in Ultrasonic Imaging Using Nonlinear Signal–Adaptive Anisotropic Diffusion" *SPIE Medical Imaging 94*, Newport Beach Calif.

Restrepo, et al., "Locally Monotonic Regression" *IEEE Transactions on Signal Processing*, vol. 41, No. 9, Sep. 1993.

*Primary Examiner*—George Manuel
*Attorney, Agent, or Firm*—Rothwell, Figg, Ernst & Kurz

[57] ABSTRACT

A method for real-time analysis and measurement of temporal tissue variations and ultrasonic signals which provides quality improvement of tissue images and qualitative and quantitative characterization of the size/shape of the imaged objects is described. A given number of image frames are stored and made available for digital data analysis. For each spatial coordinate, the temporal signal evolution or a derived temporal signal evolution is extracted. These evolutions are analyzed digitally and the resulting image can be displayed on a display unit as an improved 2D tissue image and/or an indicator image for a particular tissue or fluid category in the imaged scene. The resulting image can be further processed with a spatial filter investigating a plurality of neighboring scan lines and a plurality of neighboring ranges at each image coordinate and finally thresholded in order to obtain a binary indicator of the imaged objects that are detected in the combined time and space characterization.

20 Claims, 10 Drawing Sheets

ANALYSIS AND MEASUREMENT OF TEMPORAL TISSUE VARIATIONS

BACKGROUND OF THE INVENTION

The invention relates generally to the field of ultrasound diagnosis of living biological structures, and more particularly to methods for real-time analysis and measurement of temporal tissue variations in ultrasonic signals for quality improvement of tissue images and qualitative and quantitative characterization of the size/shape of the imaged objects.

Techniques for real-time acquisition of a sequence of ultrasonic 2D images are well known. Techniques for real-time temporal filtering of 2D images with a recursive filter are also known. Obtaining a binary quantification of a given object based on thresholding of the information in a single 2D image is described in U.S. Pat. No. 5,195,521, which issued to M. E. Hewlett and T. A. Shoup on Mar. 23, 1993 and in J. Serra. *Image Analysis and Mathematical Morphology*, Academic Press, London, 1982. Hewlett and Serra also discuss techniques for computing the area of a binary 2D-object and volume estimates based on a binary 2D-object and 3D geometry assumptions.

SUMMARY OF THE INVENTION

The invention described and claimed herein relates to a combination of temporal analysis based on a given number of ultrasonic 2D images, new principles for temporal analysis of ultrasonic signals and possible postprocessing of the temporal analysis results using spatial processing with a software/user controllable size of the local neighborhood. Furthermore, the invention includes extraction of a plurality of connected components from the binary 2D-object and simultaneous measurement and display of attributes associated with a plurality of cavities in the imaged scene. Finally, the invention gives methods for utilizing the obtained automatic quantification results in the construction of 3D and 4D geometries in 3-dimensional ultrasonic imaging.

The invention utilizes the information which is present in a time sequence of ultrasonic images—and often poorly defined in a single 2D image and provides improvements in the quality of the 2D tissue images, new modalities such as mapping indicators of specific fluids or tissue categories including the presence of ultrasonic contrast agents, and robust qualitative and quantitative size/shape characterizations of the objects detected in a combined time and space analysis.

Furthermore, the invention utilizes automatic quantization results in 2D imaging to efficiently obtain qualitative and quantitative size/shape in ultrasonic 3D imaging without reconstructing 3-dimensional images from the individual 2D images.

The implementation of the temporal processing differs from the prior art in that a given number of image frames are made available for real-time temporal analysis by any algorithm. This opens up for a variety of possible algorithms including data dependent improvement of the 2D image and mapping of new modalities such as the presence of ultrasonic contrast agents. This mapping is described more fully below.

The invention includes an improvement algorithm for 2D tissue imaging which differs from the prior art in that it locally preserves monotonic segments in the temporal direction. This property insures that the possible risk of affecting the wall movement in a sequence of 2D images is minimized. Furthermore, specific phenomena like human heart valves can be treated specifically and thus the filtering effect is fine tuned depending on the local content in the imaged scene.

The improvement algorithm for 2D tissue imaging of the invention is based on an approximation with a plurality of locally monotonic signals and differs from the prior art in that the monotonic property is exploited in an optimal way, the temporal resolution is maintained in the filtered images and temporal blurring across boundaries is inhibited.

The quantification of binary 2D-objects of the invention differs from the prior art in that it is based on the information in a given number of consecutive 2D images and not a single 2D image and can hence utilize all the potential of this invention relating to the temporal analysis. Furthermore, a spatial filter with a software/user controllable size of the local neighborhood is applied such that the resolution of the detection results can be regulated in order to reflect the quality and statistical significance of the underlying ultrasonic images.

The measurement and display of the binary quantification results differs from the prior art in that a plurality of connected components can be extracted and measured with the associated attributes displayed simultaneously.

Automatic quantification results in characterize ultrasonic 2D imaging are utilized to obtain representations of 3D structures in 3D ultrasonic imaging. This technique differs from the prior art in that qualitative and quantitative size/shape information can be obtained for 3D objects with a reduced processing requirement because the voxel reconstruction found in prior art 3D ultrasonic imaging is avoided.

BRIEF DESCRIPTION OF THE DRAWINGS

The invention shall be explained more closely in the following description with reference to the drawings, in which.

DETAILED DESCRIPTION OF THE INVENTION

Apparatus for temporal analysis

Figure 1:
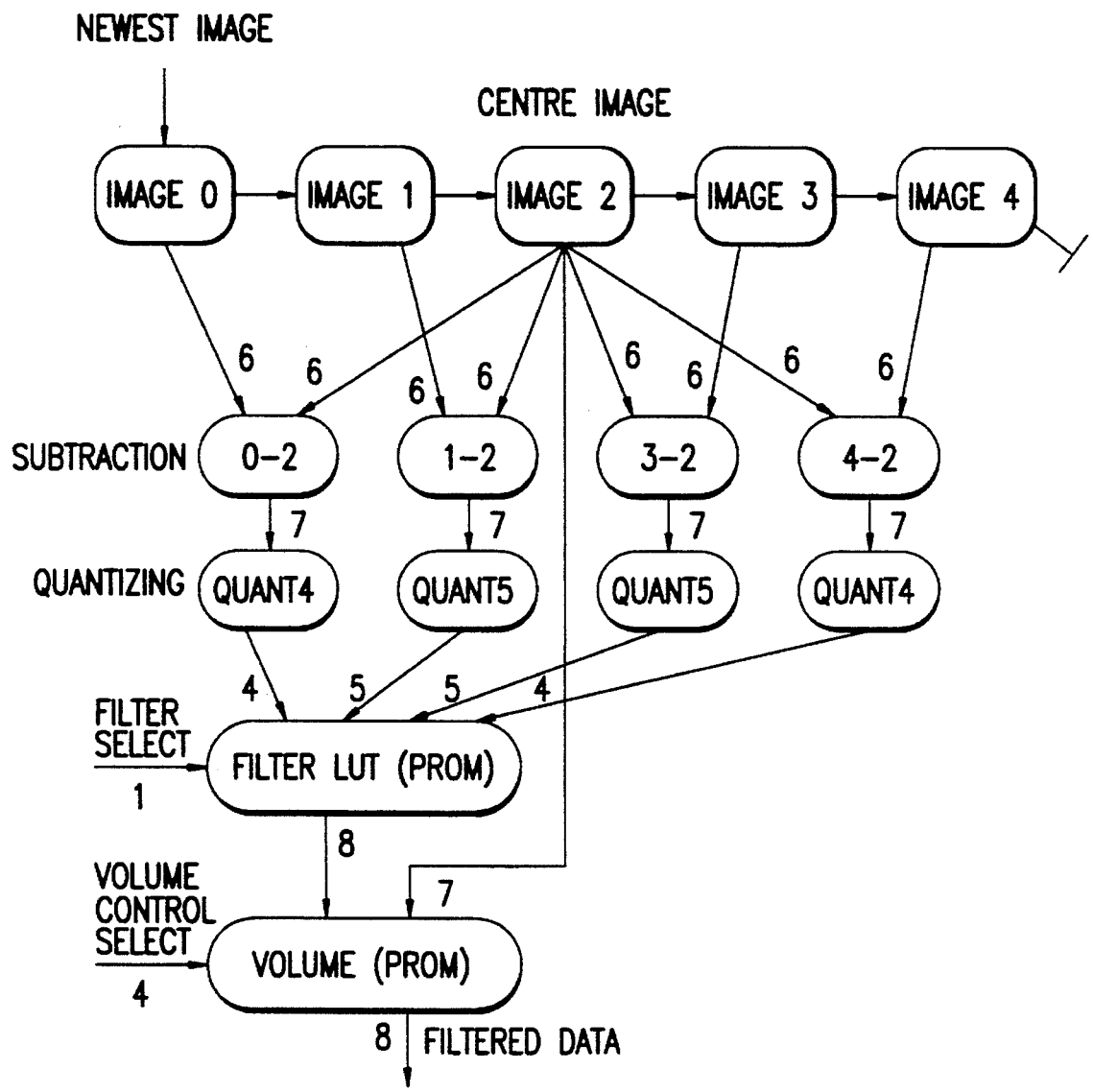
FIG. 1 shows a setup with 5 image frames, 2 images delay through the filtering process, non-recursive filtering, quantization relative to the third image, filtering in a single memory bank and mixing between the filtered result and the original third image.

Image frames are usually stored temporally in a ring buffer holding image frames inside the ultrasonic scanner for later playback and editing. Most ultrasound scanners use a filtering scheme like:

$$I_F(r,\theta) = \alpha \cdot I_F(r,\theta) + (1-\alpha) \cdot I_M(r,\theta) \quad (1)$$

where $I_F$ represents the filtered image displayed on the display unit and $I_M$ represents the image frames that are directly measured by the ultrasound scanner. Equation 1 is repeated for every range and every scan line in the image represented by r and θ respectively. The α parameter is used to regulate how wide a tail of ultrasonic images should be averaged in the temporal filter.

In the present invention the measured signals in a complete time-window are made available for digital analysis. FIG. 1, 2, 3 and 4 are block diagrams that demonstrate how this can be implemented. In this example of the invention the number of measured image frames made available for digital analysis is 5 and these images are indicated in the figures as "Image 0", "Image 1", "Image 2", "Image 3" and "Image 4". Each of these images holds the imaged values or derived image values recorded at every r and θ coordinate in the imaged scene. The digital, temporal filter is then computed as a function of a time sequence according to:

$$I_F = T(\text{Image } 0(r,\theta), \ldots, \text{Image } N(r,\theta)) \quad (2)$$

N indicates the given number of frames that are used in the temporal analysis and the equation is repeated for every range and every scan line in the images. After each new image acquisition the new image or an image with derived attributes is inserted as "Image 0", the Nth image is deleted and the rest of the images are logically shifted one position to the right. The image "Image k" will hence hold the image recorded κ time steps ago where one time step represents the acquisition time for a single 2D image. In FIGS. 1, 2, 3 and 4 one of the images is labeled as the "Centre image". This image is the image frame that corresponds with the output of the temporal filtering.

FIGS. 1, 2, 3 and 4 also indicate how a quantized bit representation can be obtained of the temporal signal. The bit representation is obtained with one of two techniques:

1. Each of the values are quantized with a given number of bits applying either direct, linear quantization or other known techniques for optimal, nonlinear vector quantization. The number of bits can be unevenly distributed along the temporal signal such that values close to the "Centre image" use many bits and values far from the "Centre image" use few bits and are hence only represented with a coarse quantization.
2. Only the differences from the value in the "Centre image" are quantized with a given number of bits applying either direct, linear quantization or prior art for optimal, nonlinear vector quantization. The number of bits can once again be unevenly distributed along the temporal signal such that values close to the "Centre image" use many bits and values far from the "Centre image" use few bits and are hence only represented with a coarse quantization. The temporal filter will in this case be independent of the DC-level in the signal and the original "Centre image"-value must be added back in order to restore the correct DC-level. FIGS. 1, 2, 3 and 4 illustrate this principle with a "Volume (PROM)" that mixes the filtering result with the original "Centre image"-value and can regulate the strength of the final temporal filter.

The quantized bit representation can be used to restore a quantized representation of the original temporal signal. The actual filter is therefore constructed by going through all possible bit representations, restoring the original temporal signal, computing a temporal filter by any known algorithm on a computer and storing the result at the address associated with the bit representation. The real-time filter is then realized as a look-up in a memory bank holding the precomputed filtering results at the address given by the quantized bit representation of the temporal signal. FIGS. 1, 2, 3 and 4 illustrate this with an example. The module "Filter LUT (PROM)" holds the precomputed filter in a $2^{18}$ Byte (=256 kByte) memory module which is indexed by the quantized bit representation of 4+5+5+4=18 bits. The size of the memory module increases exponentially with the number of bits in the quantized representation of the temporal signal. Large temporal windows with detailed quantization can be realized by a similar approach. The temporal signal in this case is decomposed into bit sequences that can be filtered independently with a direct memory access and the output from these memory modules are interconnected in a hierarchical manner with the topmost memory module holding the final filter result computed from the entire temporal signal. This approach nevertheless somewhat limits the number of filtering schemes that can be implemented.

Figure 2:
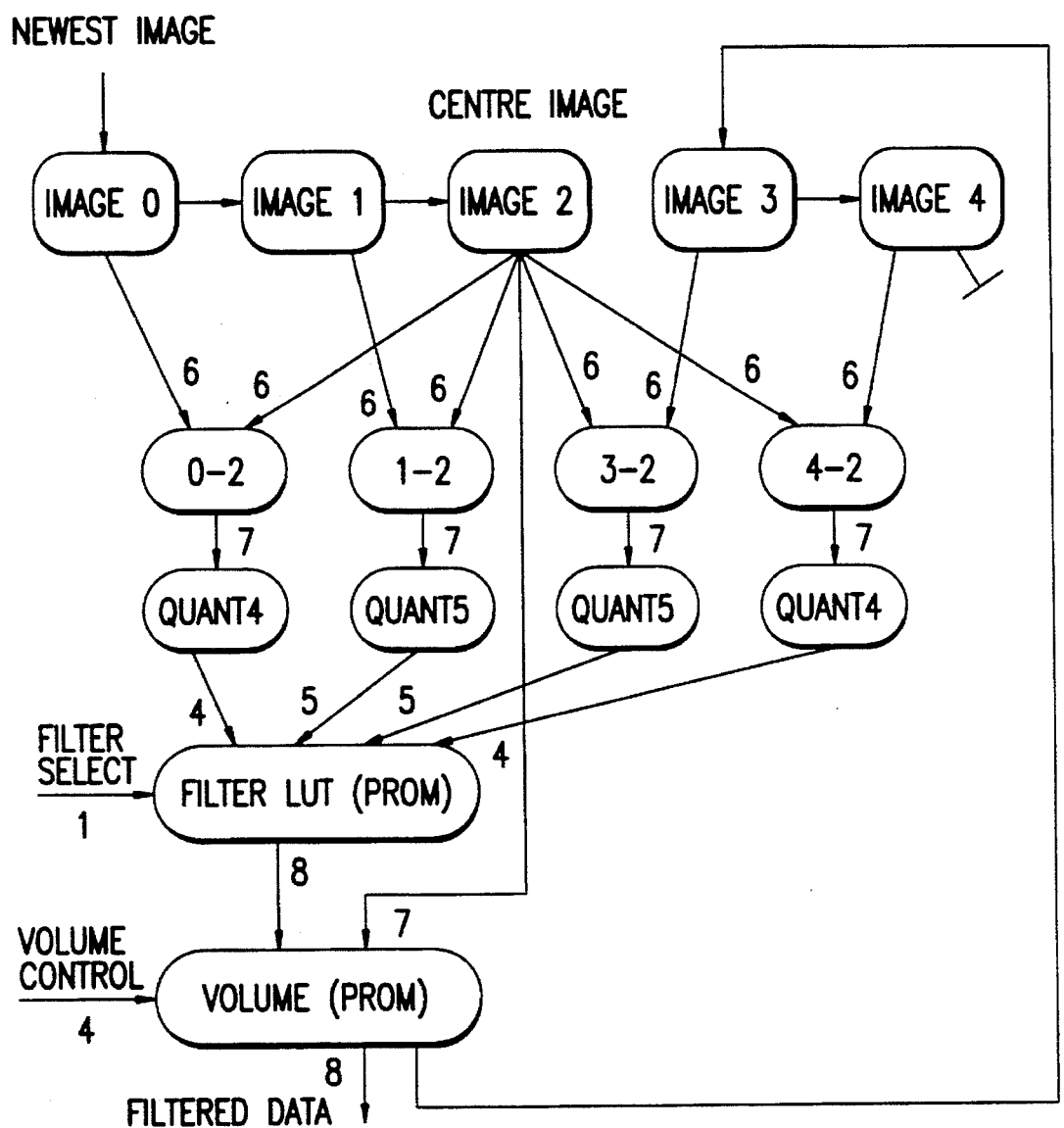
FIG. 2 is similar to FIG. 1 except that the fourth image receives the filtered image instead of the old content in the third image in order to obtain recursive filtering.
Figure 3:
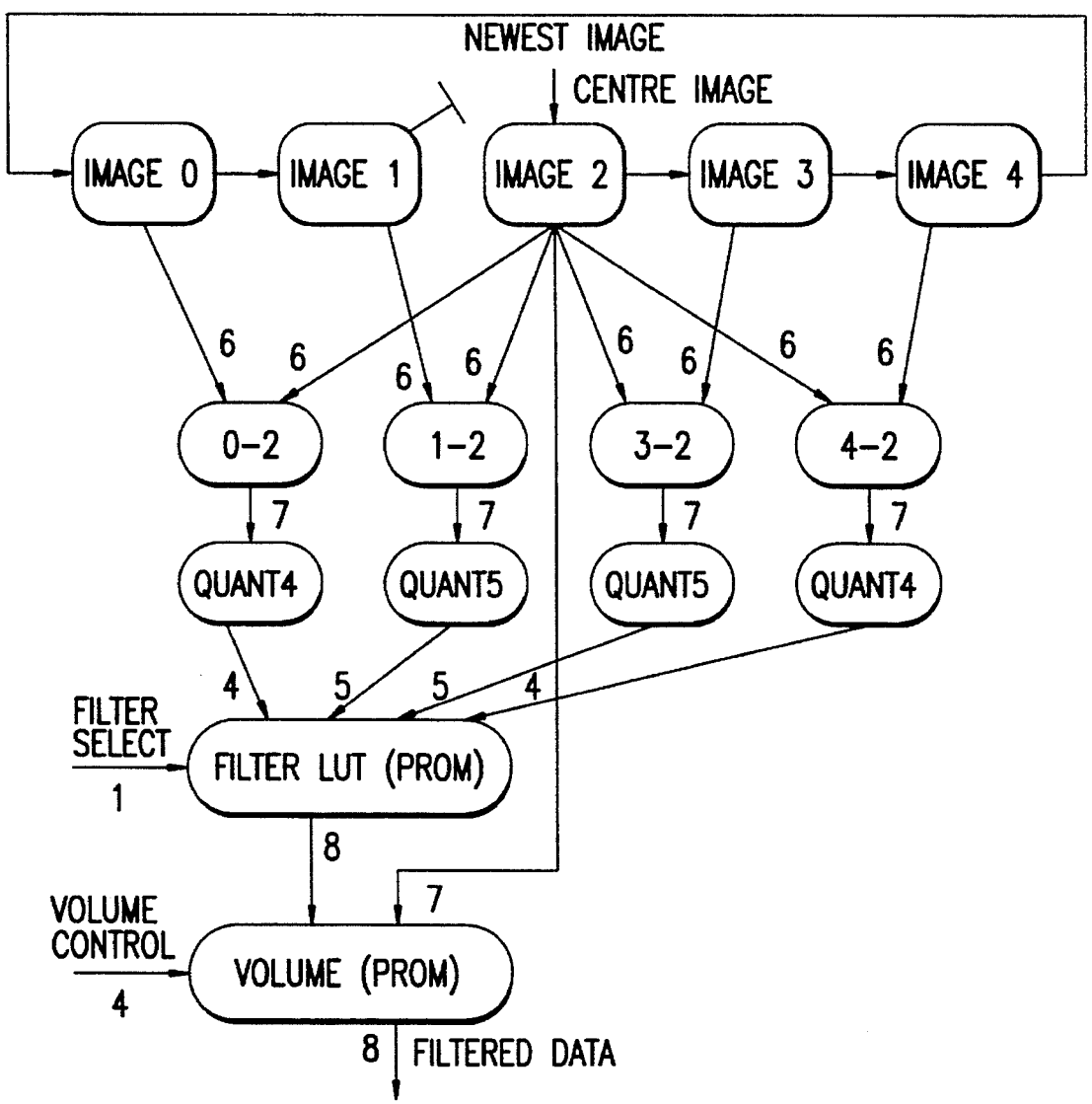
FIG. 3 is similar to FIG. 1 except that the data entry has been modified such that the data has no delay through the filtering process.
Figure 4:
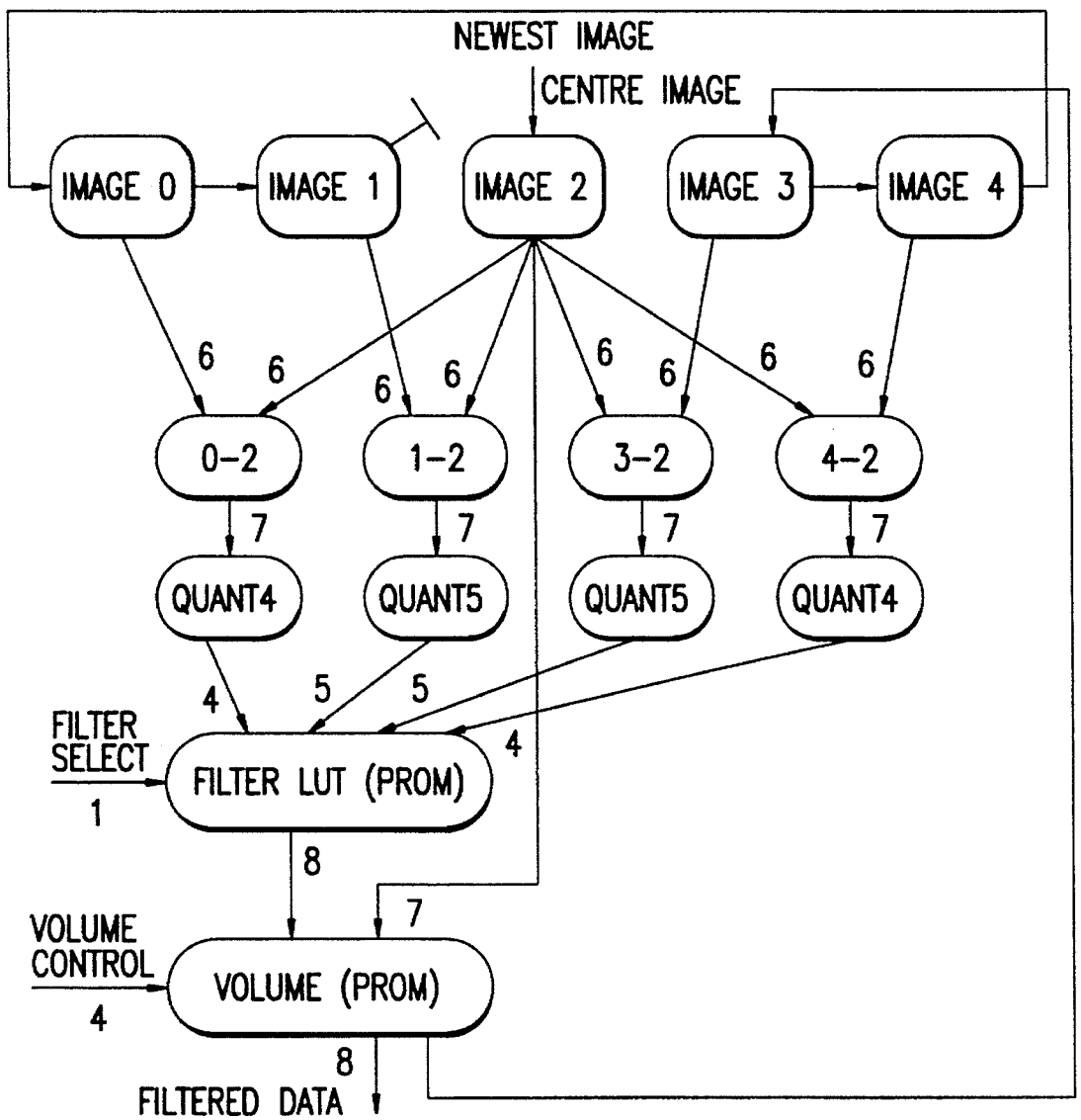
FIG. 4 is similar to FIG. 3 except that a possible modification for recursive filtering has been indicated.
Figure 5B:
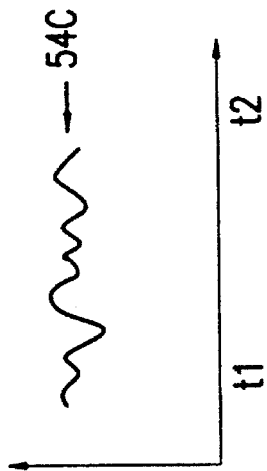
FIG. 5 illustrates how temporal signals are generated for various spatial locations in a 2D scene.
Figure 5C:
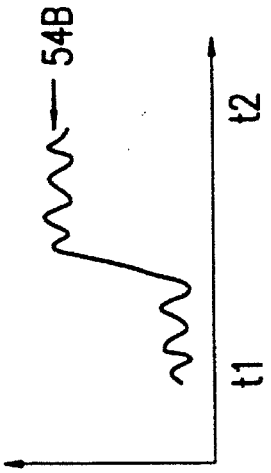
Figure 5D:
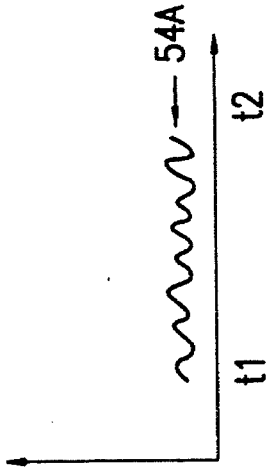
Figure 5A:
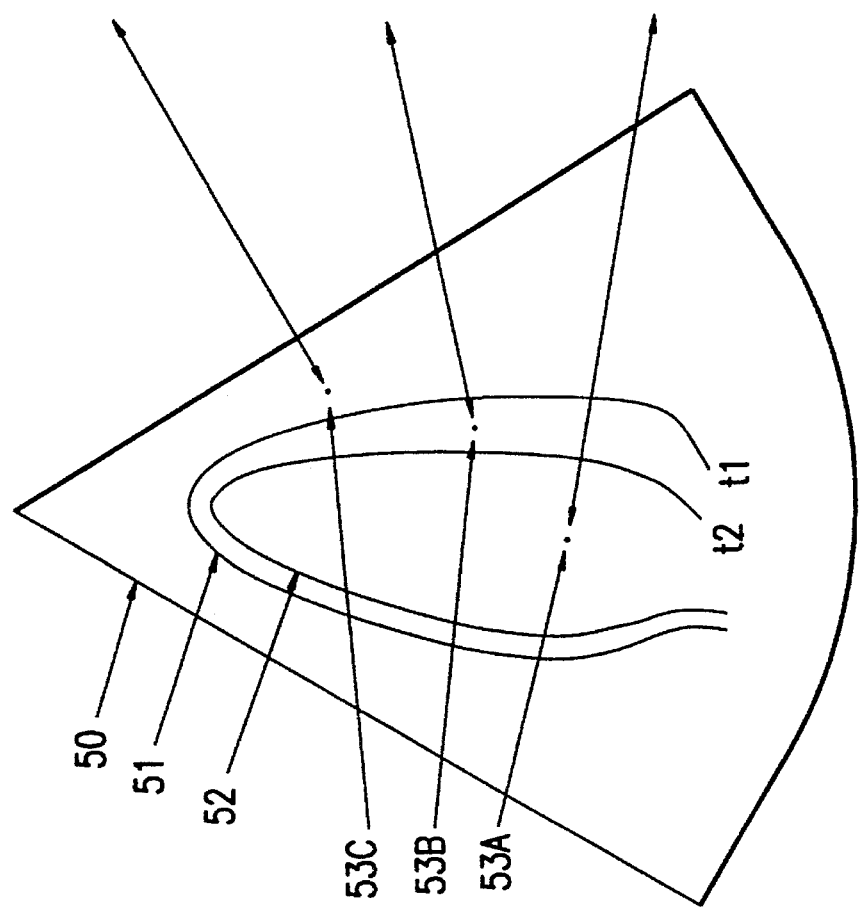

FIG. 2 illustrates how the image flow can be redirected such that the image after the "Centre image" receives a copy of the filtered image instead of the "Centre image" itself in the next iteration. This redirection will allow for recursive filtering schemes with the values after the "Centre image".

Temporal analysis of ultrasonic signals

The visual inspection of a real-time display of 2D ultrasonic images is often an important additional source of information compared to the inspection of a single 2D frame. This fact is even more prominent if the temporal processing found in current ultrasound scanners is turned off. Many fluids and tissue categories can be better identified if the characterization utilizes information from both the time and space domain instead of purely spatial information as found in previous real-time quantification as described, for example, in Hewlett & Shoup referred to above.

Improvement of 2D tissue B-scan images

For temporal filtering of ultrasonic images, it was previously known to reduce the speckle and noise components at the cost of reduced wall motion and blurring of rapidly moving structures like valves. Techniques previously known for temporal filtering have therefore usually been restricted to a conservative compromise between these two properties. The temporal analysis of the present invention allows for the real-time implementation of any filter and can therefore be utilized to implement temporal filters for improvement of 2D tissue B-scan images. The traditional recursive filter given in equation 1 can for example be implemented as:

$$\begin{aligned} I_F &= T(\text{Image } 0(r,\theta), \ldots, \text{Image } N(r,\theta)) \\ &= T(t_0, t_1, \ldots, t_N) \\ &= (1-\alpha)t_0 + \alpha(1-\alpha)t_1 + \ldots + \alpha^N(1-\alpha)t_N \end{aligned}$$

A primary design criterion for temporal ultrasonic filters is that the temporal blurring should be avoided while speckle and noise structures still can be suppressed in the image sequence. This invention therefore uses temporal filters for improvement of 2D tissue images that are designed to preserve significant monotonic sequences in the temporal signals. The algorithms described in P. Perona and J. Malik, "Scale-space and edge detection using anisotropic diffusion", *IEEE Trans. on Pattern Anal. and Machine Intell.*, 12(7), July 1990; E. Steen and B. Olstad, "Scale-space and boundary detection in ultrasonic imaging, using signal-adaptive anisotropic diffusion", *In Proceedings of SPIE Medical Imaging '94*, NewPort Beach Calif., 1994; A. Restrepo and A. C. Bovik, "Locally monotonic regression", *IEEE Trans. on Signal Processing*, 41(9), September 1993 can by proper adjustment to some extent achieve this property when the filters are applied as temporal filters in the context of the present invention.

Figure 6B:
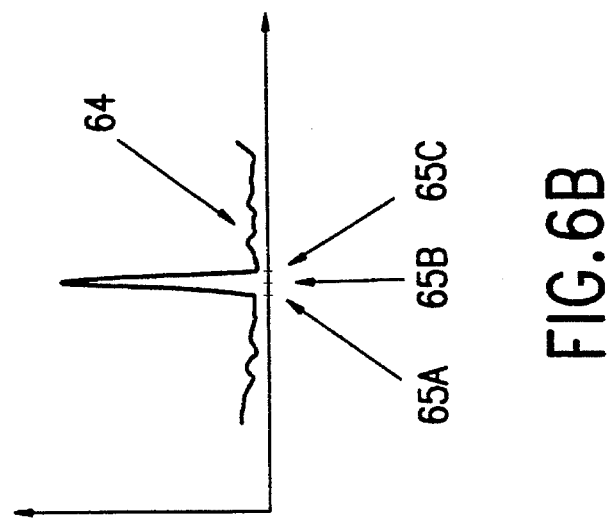
FIG. 6 illustrates a temporal signal generated by a rapidly moving structure which passes a given spatial coordinate.
Figure 6A:
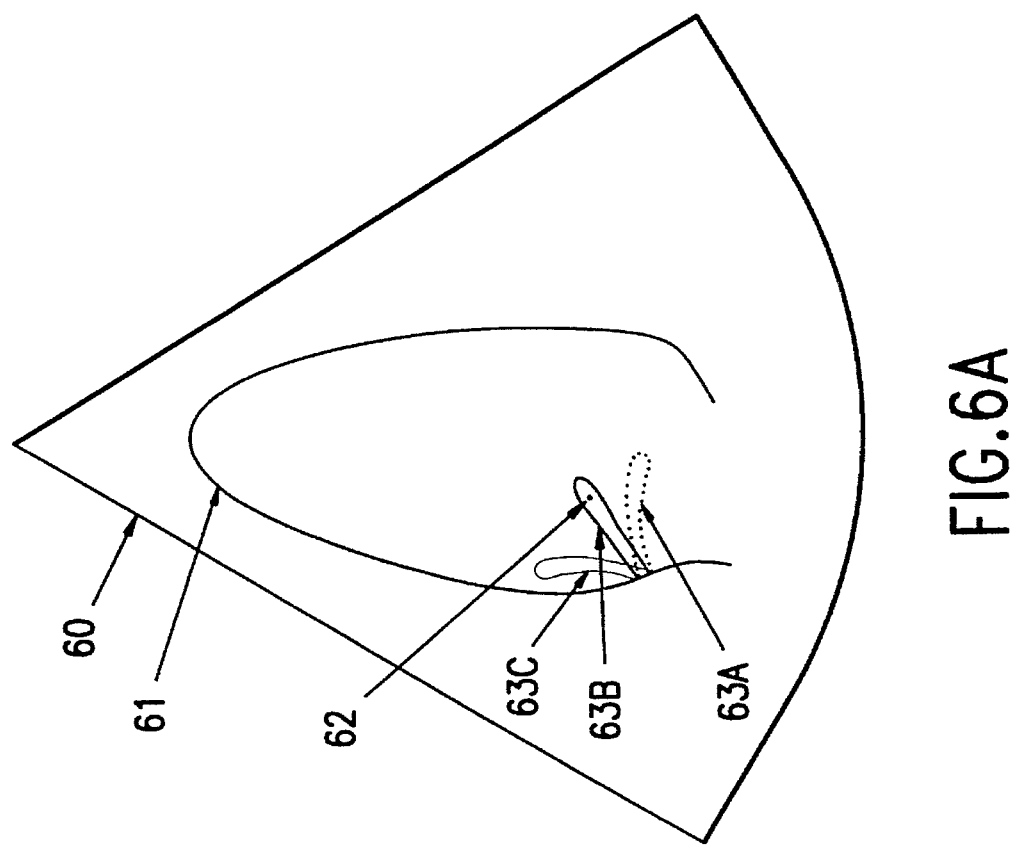

In FIGS. 5 and 6 human heart structures are taken as relevant examples for explaining important aspects of this invention. FIG. 5 illustrates how a wall moving past a given spatial coordinate generates a monotonic transition in the temporal signal evolution. The 2D tissue image is given by 50. The temporal signal is labelled 54 B and the associated spatial coordinate is labelled 53 B. The location of the wall is indicated for two time instances labelled $t_1$ (51) and $t_2$ (52). Filters that modify the shape of the transition in signal 54 B (including the filter given in equation 1) will move the localization of the transition in the temporal direction and consequently the visual appearance of the wall motion will be affected during the inspection of a sequence of 2D images. We therefore require that significant transitions are maintained in the filtered signal. FIG. 5 also indicates a possible temporal variation 54 A found inside a cavity 53 A. The fluctuations here are stochastic and often uncorrelated in the temporal direction. No significant monotonic transitions are therefore found in the signal and the filtering effect can be tuned to maximize the suppression of speckle and noise. FIG. 5 also indicates a possible temporal variation 54 C found inside tissue 53 C. The filtering effect is here tuned such that noise is reduced, but the textural appearance of the tissue is still maintained.

Rapidly moving structures generate a spike in the temporal signal. This is illustrated in FIG. 6 with an ultrasonic 2D tissue image 60. The ventricle wall 61 is indicated together with the location of the mitral valve in three consecutive 2D tissue images, 63 A, 63 B and 63 C. A temporal signal 64 is indicated for the position 62 such that 63 A and 65A are sampled in the same 2D tissue image. Similarly, 63 B and 65 B are sampled in the same 2D tissue image and finally, 63 C and 65 C are sampled in the same 2D tissue image. The filter is therefore fined tuned for precise imaging of for example heart valves by estimating the size or statistical significance of spikes and allowing these signal to pass through the filter un-processed or even enhanced by the temporal filter.

The invention uses a direct approach to obtain temporal filtering that preserves significant monotonic sequences. The method applies to a 1-dimensional sequence of measurements that can represent the temporal evolution of measurements at a fixed spatial location in 2- or 3-dimensional ultrasonic imaging. The 1-dimensional signal is approximated with a number of monotonic segments. A single monotonic segment is computed by minimizing the square error between the measurements and the monotonically increasing or decreasing filtered signal. This technique is described in A. Restrepo and A. C. Bovik, "Locally monotonic regression", *IEEE Trans. on Signal Processing*, 41(9), September 1993 and the references cited therein. In contradiction to the work by A. Restrepo and A. C. Bovik, the present invention does not require that the temporal signal should be locally monotonic at each point. This requirement effectively reduces the maximal frame rate of the original image sequence. Instead we require that the temporal signal can be decomposed into a sequence of consecutive intervals that are locally monotonic. The actual number of segments is either specified a priori as a parameter to the algorithm or in terms of a maximal number of segments. In the latter case, the correspondence with the actual measurements is used to estimate the actual number of monotonic segments present in the signal being analyzed. The approximation can be efficiently computed with dynamic programming according to the equation:

$$E(n,1,j) = \min_{i=1,\ldots,j-1}\{E(n-1, 1, i) + E_{Mono}(i+1,j)\} \quad (2)$$

$E(n,1,j)$ denotes the error obtained in the approximation of the signal $(t_1, t_2, \ldots, t_j)$ with n monotonic segments and $E_{Mono}(i+1,j)$ denotes the error obtained in the approximation of the signal $(t_{i+1}, \ldots, t_j)$ with a single monotonic segment as described by A. Restrepo and A. C. Bovik referred to above. The actual filter values can be computed by maintaining information about where the optimal subdivisions were located and then computing monotonic approximations in each of these segments independently.

The monotonic regression limits the oscillatory behavior of the signal, but preserves significant transitions in the signal and inhibits blurring across the boundaries between adjacent segments. In temporal analysis of ultrasound these filter qualities are exploited to obtain significant noise reduction without effecting wall motion and valve identification.

Creation and quantification of new modalities

The temporal analysis described herein allows for implementation of any filter and can therefore also be utilized to extract other types of information from the temporal signals in addition to the improved 2D tissue B-scan image. The temporal analysis can be described as follows $$I_{FI} = T(\text{Image } 0(r, \theta), \ldots, \text{Image } N(r, \theta))$$
$$= T(t_0, t_1, \ldots, t_N)$$

$I_{FI}$ denotes a feature indicator and $t_0, t_1, \ldots, t_N$ are the temporal sequence of measured signals or derived information acquired at a given spatial coordinate and supplied to the temporal analysis. $T(\cdot)$ denotes the temporal analysis that extracts the indicator for the presence of a given feature in the temporal signals. The temporal analysis, $T(\cdot)$ can be tailored such that I becomes an indicator for a specific fluid or a specific tissue category or blood containing ultrasonic contrast agents or various blood perfusion levels in a given tissue category. The resulting image is displayed on a display unit in real-time either as a separate image or color encoded together with the 2D tissue image.

A temporal analysis that characterizes the temporal activity can be utilized as a feature indicator to map specific features including the presence of ultrasonic contrast agents. The temporal activity can be characterized by measurement of the signal variance in the temporal direction either by a direct measurement of the statistical variance or by first normalizing the signal according to the description herein for obtaining improved 2D tissue images. The said normalization will assure that significant monotone transitions due to, for example, wall movement will not be encoded as high temporal activity regions.

Increasing spatial and temporal resolution

The speed of sound in water/tissue limits the number of beams that can be measured per second. Assume that a given ultrasound scanner can measure N beams per second during real-time 2D tissue imaging. Previous ultrasound systems for 2D tissue imaging will allow the user to select a given frame rate. Let this selected frame rate be denoted by F where typical values currently are in the range of 20 to 60. N/F beams will in this case be available to sample a single 2D frame and the displayed images are spatially interpolated versions of the 2D frames.

In order to improve the spatial resolution and/or the frame rate of 2D tissue imaging the temporal analysis is applied to improve the quality of spatial interpolation. The technique is based on the following steps:

1. Let M denote the number of beams in a single frame and let F denote the frame rate (the number of images per second). The M beams are first spatially interpolated such that an image equivalent to an ordinary acquisition with M·κ beams is obtained. κ is a parameter of the procedure and takes on the values 2, 3, 4, . . . , $κ_{max}$. $κ_{max}$ is given by the processing capacity of the ultrasound scanner.
2. Step 1 is repeated κ times such that the M measured beams in each acquisition are shifted such that each of the M·κ beam positions are measured exactly once after the κ iterations of step 1.
3. Steps 1 and 2 are then repeated continuously and the resulting sequence of 2D images with M·κ beams each are applied as input to a temporal analysis/interpolation scheme including techniques described herein.
4. The temporal analysis can in addition utilize side information about the localization of the measured beams such that these measurements can be emphasized in the temporal processing.

Figure 7:
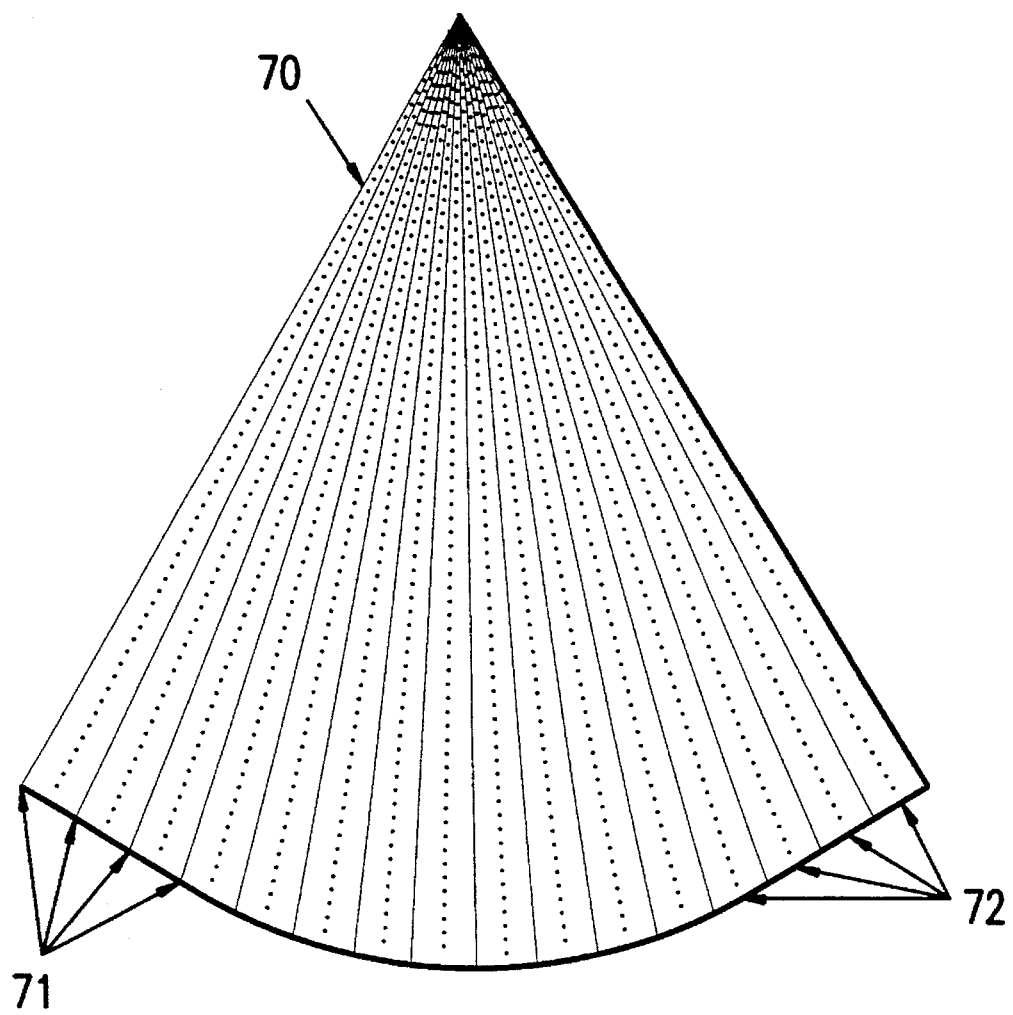
FIG. 7 illustrates how the beam pattern can be shifted in a cyclic manner.

The described technique can be used to increase the spatial resolution for a fixed frame rate or to increase the frame rate for a given spatial resolution or to obtain improvements in both frame rate and spatial resolution. FIG. 7 illustrates the concept for a 2D tissue image 70. The figure illustrates the example with κ=2. Every even image frame in the temporal ordering is sampled with the beams 71 and every odd image frame in the temporal ordering is sampled with the beams 72. The scanning pattern between the individual 71-beams is arbitrary and can be utilized to optimize the image quality. Similarly, the scanning pattern between the individual 72-beams is also arbitrary.

Spatial processing of temporal indicators

Figure 8:
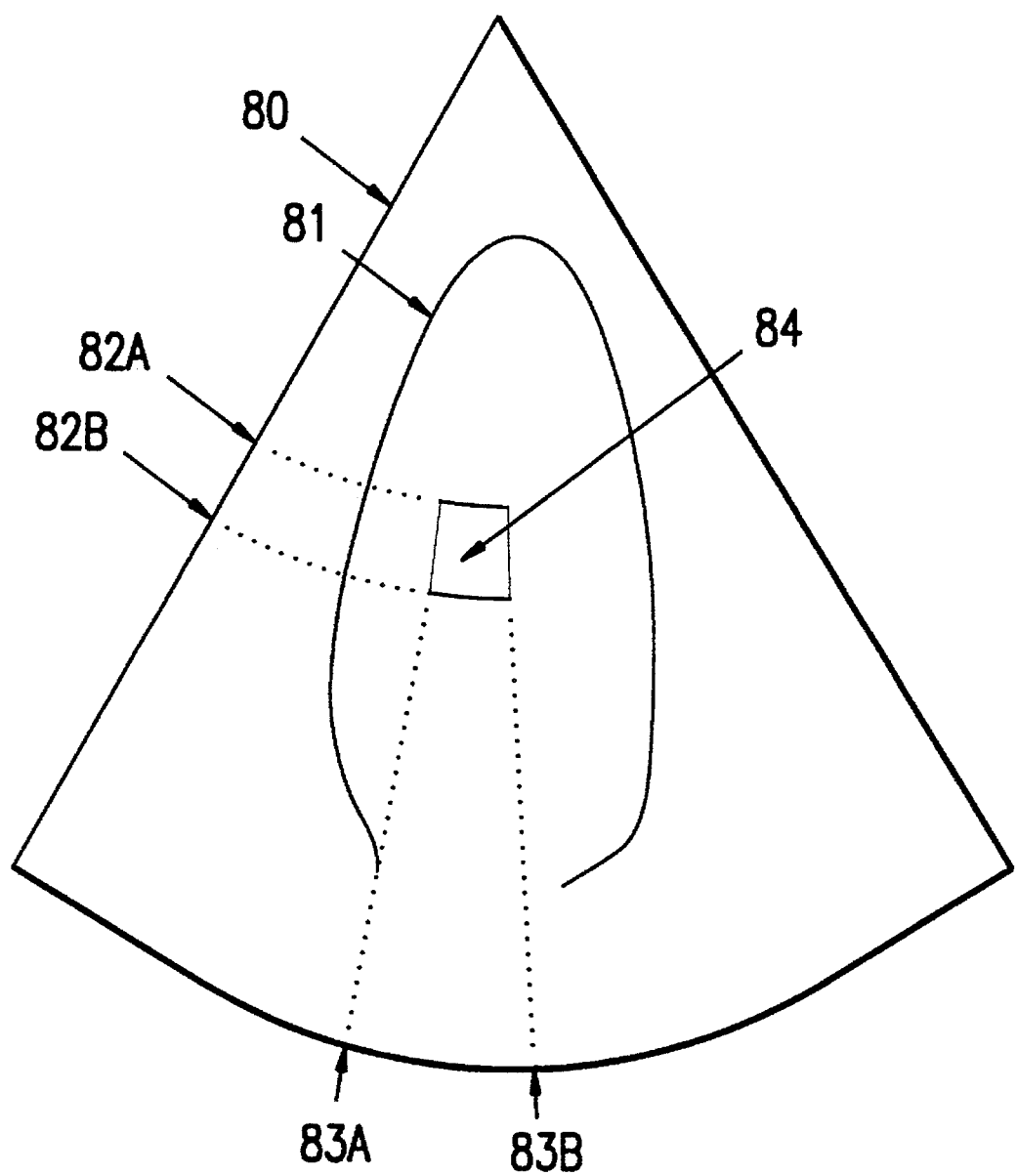
FIG. 8 illustrates the spatial neighborhood used in the real-time spatial postprocessing of the characterizations obtained in the temporal analysis.

The said non-binary indicator images obtained in the temporal analysis as described above are processed with a spatial neighborhood filter in real-time in order to improve the statistical robustness of the estimates obtained in the said temporal analysis. The spatial filter is designed such that a plurality of neighboring scan lines and a plurality of neighboring ranges are investigated before the image is thresholded to obtain a binary indicator image. FIG. 8 illustrates the input to the spatial filter for a 2D tissue image 80. A possible imaged object like the left ventricle 81 is indicated. The spatial neighborhood 84 includes a plurality of ranges between a minimal range value 82 A and a maximal range value 82 B. The neighborhood 84 also includes a plurality of scan lines between a leftmost scanline 83 A and a rightmost scanline 83 B.

The spatial neighborhood filter is designed such that the user or an automatic procedure can determine a proper dimension in terms of the number of neighboring scan lines and the number of neighboring ranges. The robustness/precision of the spatial processing can in this way be regulated in order to match the quality of the statistical evidence extracted from the underlying sequence of ultrasonic images.

Real-time spatial filtering with large neighborhoods is realized by first thresholding the input image and then accumulating the number of image elements above the threshold level inside the spatial neighborhood and finally thresholding this number with a value depending on the size of the spatial neighborhood.

The threshold level is a parameter set by the user or by automatic procedures. The threshold level is allowed to vary with the spatial position in the image given by the index of the associated scan line and the index of the associated range.

Extracting information from binary indicator images

Figure 9:
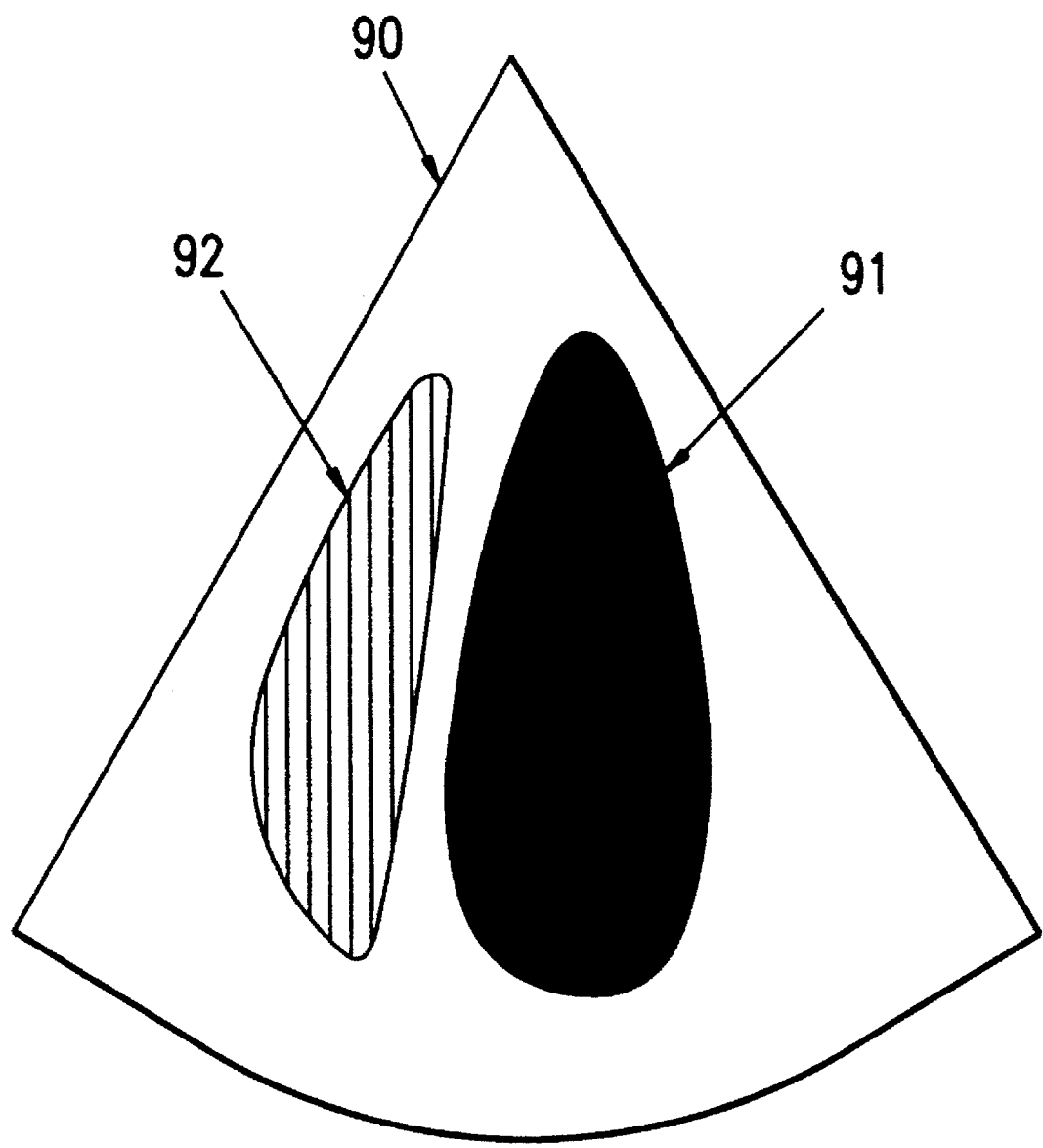
FIG. 9 illustrates a binary indicator image with two connected components.

The binary indicator image is processed spatially and separated into its connected components. See J. Serra, *Image Analysis and Mathematical Morphology*, Academic Press, London, 1982 for a definition of connected components. FIG. 9 illustrates extraction of connected components in a 2D tissue image 90. In this example the binary indicator image is separated in two components 91 and 92.

The digital representations of the borders of the said connected components are made available for real-time analysis with digital processing and the extracted attributes are displayed simultaneously for the said connected component.

The extraction of connected components allows for improved user-interfaces where a given object in the imaged scene can be specified by simply providing a point inside the region of a complete region of interest as described in U.S. Pat. No. 5,195,521. Extracting multiple objects also allows for simultaneous, coregistered investigation of more than one cavity.

3-dimensional ultrasonic imaging

By the term 3-dimensional ultrasound imaging we mean
1. 3-dimensional ultrasound acquisition for reconstruction of a 3-dimensional geometry, or
2. triggered 3-dimensional cineloop acquisition for reconstruction of time dependent 3-dimensional geometry, or
3. real-time 3-dimensional acquisition where the three spatial dimensions are scanned fast enough to provide information about time dependent 3-dimensional geometry.

Previously, 3-dimensional ultrasound imaging has been based on the processing of properly organized multidimensional representations of the acquired data. Large data sets are hence processed and the computational requirements for obtaining visualizations or measurements are very high.

This invention utilizes the said binary indicator images to obtain qualitative and quantitative characterizations of the 3D geometry obtained in 3-dimensional ultrasound imaging. The binary indicator images can be obtained by the techniques described in this invention or by techniques providing real-time quantification of the information content in a single 2D ultrasonic image such as is in U.S. Pat. No. 5,195,521. This alternative constitutes a separate or independent aspect of the invention.

Figures 10A, 10B:
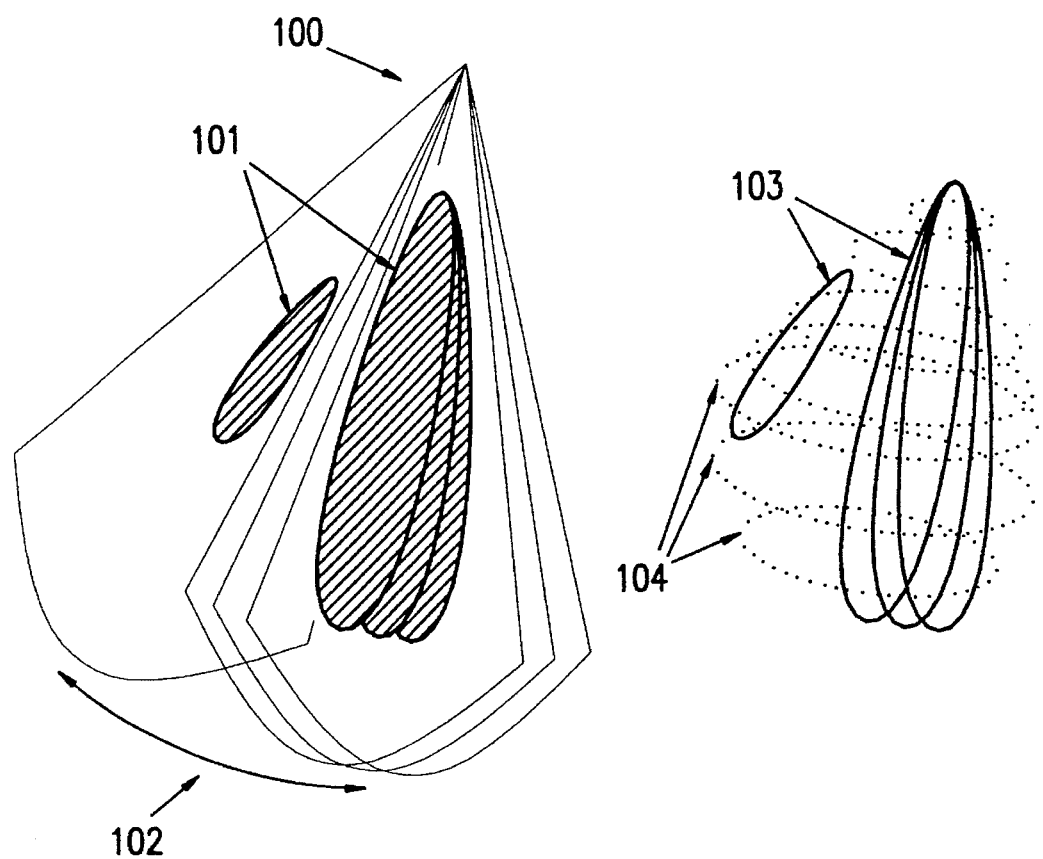
FIG. 10 illustrates how binary indicator images can be integrated in 3-dimensional ultrasound imaging to obtain characterizations of the complete 3-dimensional geometry of the imaged object.

The 3-dimensional geometry is obtained by digital integration of the binary components as illustrated in FIG. 10. A complete 3 dimensional data set 100 is indicated. In this example a 2 dimensional tissue image has been tilted 102, but other geometries like those obtained by translation and rotation are also possible. The 3 dimensional dataset can be part of a sequence of such datasets which includes the time variations of the imaged 3 dimensional scene. The extracted quantification results from the underlying 2D imaging 101 are indicated in the figure along with a geometrical organization 103 of the boundaries of these objects. Overlapping components are integrated by correlation of neighboring points at the boundaries. The computational load of this process is small due to the fact that simply the digital representations of the boundary of the binary components determined in the real-time quantification must be handled. The interpolated geometry 104 is also indicated in FIG. 10.

The reconstructed 3-dimensional geometries obtained by said technique can be visualized and measured with known techniques for visualization and measurement of 3D objects. Said visualizations and measurements can hence be obtained with a small processing load and the said visualizations and measurements can be maintained in real-time for real-time 3-dimensional ultrasound imaging.

The above description can be summarized as follows:

The invention encompasses methods for real-time analysis and measurement of temporal tissue variations in ultrasonic signals for quality improvement of tissue images and qualitative and quantitative characterization of the size/shape of the imaged objects. The methods are used for analysis of the ultrasonic signals acquired for investigation of living biological structures. The main application will be in hospitals and the like. The methods apply to a real-time ultrasonic acquisition of 2D images. A given number of the most recent image frames are stored and made available for digital data analysis. For each spatial coordinate the temporal signal evolution or a derived temporal signal evolution is extracted. These evolutions are analyzed digitally and the resulting image can be displayed on a display unit as an improved 2D tissue image and/or an indicator image for a particular tissue/fluid category in the imaged scene. According to a particular and important aspect of this invention the said resulting image can be further processed with a spatial filter investigating a plurality of neighboring scan lines and a plurality of neighboring ranges at each image coordinate and finally thresholded in order to obtain a binary indicator of the imaged objects that are detected in the combined time and space characterization. A plurality of connected components are extracted from the binary indicator image and made available for real-time computer processing including measurement and simultaneous display of area and/or other derived attributes associated with the said connected components. The digital representations of the said connected components or other techniques for real-time quantification of ultrasonic images are used in 3-dimensional ultrasonic imaging to accumulate 3-dimensional and 4-dimensional geometries for size/shape characterizations through 3D measurements and visualizations.

We claim:

1. A method for real-time analysis and measurement of variations in ultrasonic signals comprising the steps of:

acquiring and storing a predetermined number ultrasonic image frames;

updating the stored number of image frames with deletion of the oldest frame and inclusion of a new image frame;

making the stored number of image frames available for digital data analysis;

digitally analyzing the temporal evolution at each spatial coordinate in the stored ultrasonic image frames;

storing the result of the temporal analysis as a non-binary indicator image; and displaying said non-binary indicator image on a display unit.

2. The method according to claim 1, further comprising the steps of:

processing of the non-binary indicator image with a spatially varying threshold level to produce a binary indicator image;

extracting a plurality of connected components from the binary indicator image;

extracting digital representations of the borders of the said connected components and making them available for real-time analysis with digital processing; and in real-time displaying the area and other derived attributes associated with a plurality of the said connected components simultaneously.

3. The method according to claim 2, further comprising the step of digital integration of a sequence of said connected components extracted in a 3-dimensional ultrasound acquisition for reconstruction of a 3-dimensional geometry.

4. The method according to claim 2, further comprising the step of digital integration of said connected components from a given number of cineloops in a triggered 3-dimensional ultrasound acquisition for reconstruction of time dependent 3-dimensional geometry.

5. The method according to claim 2, further comprising the step of digital integration of said connected components from a real-time 3-dimensional ultrasound acquisition providing real-time, time dependent 3-dimensional geometry description.

6. The method according to claim 1, further comprising the steps of:

storing the said ultrasonic image frames in a fixed sized first in first out queue of images and maintaining the recording order between the image frames;

quantizing the temporal signals with a given number of bits distributed among the image frames; and using the said bit representation as a lookup address in a memory bank holding a precomputed representation of the temporal filter.

7. The method according to claim 6, further comprising the step of selecting a frame in the sequence of image frames and redirecting the flow of image frames such that the said non-binary indicator image replaces the selected image frame in the next time step when a new image frame has been acquired in order to achieve recursive filtering in a portion of the said sequence of image frames.

8. The method according to claim 6, further comprising the step of quantizing the values obtained in a sequence of image frames at a given spatial coordinate relative to a value associated with a selected image frame in the said sequence of image frames and then mixing the said value associated with the selected image frame with the filter result given by the value of the non-binary indicator image at the same spatial coordinate in order to reduce the number of bits in the said quantized bit representation.

9. The method according to claim 1, further comprising the steps of computing the said non-binary indicator image obtained by said temporal evolution analysis as an improved version of the 2D tissue B-scan image and displaying it on a display unit in real-time.

10. The method according to claim 1, further comprising the step of applying a filter that locally preserves monotonic segments in the said temporal evolution analysis.

11. The method according to claim 10, further comprising the step of using an approximation of the temporal signals with a plurality of locally monotonic signals as a basis for the said analysis of temporal evolutions.

12. The method according to claim 1, further comprising the steps of computing the said non-binary indicator image obtained by the said temporal analysis as an indicator for a specific material, and displaying it on a display unit in real-time.

13. The method according to claim 12, further comprising the step of using a measure of the temporal variance as a basis for the said analysis of temporal evolutions.

14. The method according to claim 12, further comprising the steps of spatially interpolating a number of scan lines between each measured scan line in the 2D ultrasonic images, offsetting the position of the measured scan lines in a cyclic manner between each 2D image acquisition such that all scan lines are measured exactly once after a complete cycle, and applying this sequence of images to the said temporal analysis.

15. The method according to claim 1, further comprising the step of processing of the said non-binary indicator image with a spatial neighborhood filter investigating a plurality of neighboring scan lines and a plurality of neighboring ranges before the said temporal indicator image is thresholded.

16. The method according to claim 15, further comprising the steps of computing the said filter by first thresholding the image, accumulating the number of image elements above the threshold level inside the said spatial neighborhood and thresholding this number with a value depending on the size of the said spatial neighborhood.

17. The method according to claim 16, further comprising the step of regulating the size of the said spatial neighborhood such that the detection resolution can be regulated to match the quality of the underlying ultrasonic images.

18. A method for synthesizing at least one 3-dimensional geometry in 3-dimensional ultrasound imaging based on the results of a method for real-time analysis and measurement of temporal and/or spatial tissue variations in ultrasonic signals during investigation of living biological structures for quantitative and qualitative characterization of size/shape of the imaged objects including cavities, vessels, tissue categories or various blood perfusion levels in a given tissue category comprising the steps of:

producing a binary indicator image based on the information content in a single 2D ultrasonic image frame or a sequence of 2D ultrasonic image frames in real-time, extracting a plurality of connected components from the said binary indicator image, and digitally reconstructing 3-dimensional geometries by integration of a sequence of said connected components extracted during a 3-dimensional ultrasound acquisition for reconstruction of a 3-dimensional geometry.

19. A method for synthesizing at least one 3-dimensional geometry in 3-dimensional ultrasound imaging based on the results of a method for real-time analysis and measurement of temporal and/or spatial tissue variations in ultrasonic signals during investigation of living biological structures for quantitative and qualitative characterization of size/shape of the imaged objects including cavities, vessels, tissue categories or various blood perfusion levels in a given tissue category comprising the steps of:

producing a binary indicator image in real-time based on the information content in a single 2D ultrasonic image frame or a sequence of 2D ultrasonic image frames, extracting a plurality of connected components from the said binary indicator image, and digitally reconstructing 3-dimensional geometries by integration of a sequence of said connected components extracted during a triggered 3-dimensional ultrasound acquisition for reconstruction of time dependent 3-dimensional geometry.

20. A method for synthesizing at least one 3-dimensional geometry in 3-dimensional ultrasound imaging based on the results of a method for real-time analysis and measurement of temporal and/or spatial tissue variations in ultrasonic signals during investigation of living biological structures for quantitative and qualitative characterization of size/shape of the imaged objects including cavities, vessels, tissue categories or various blood perfusion levels in a given tissue category comprising the steps of:

producing a binary indicator image in real-time based on the information content in a single 2D ultrasonic image frame or a sequence of 2D ultrasonic image frames, extracting a plurality of connected components from the said binary indicator image, and digitally reconstructing 3-dimensional geometries by integration of a sequence of said connected components extracted during a real-time 3-dimensional ultrasound acquisition providing real-time, time dependent 3-dimensional geometry description.

* * * * *

UNITED STATES PATENT AND TRADEMARK OFFICE
CERTIFICATE OF CORRECTION

PATENT NO. : 5,476,096
DATED : December 19, 1995
INVENTOR(S) : Bjørn Olstad et al.

It is certified that error appears in the above-indentified patent and that said Letters Patent is hereby corrected as shown below:

Col. 2, line 53, "FIG. 5" should be -- FIGS. 5A-D --; Col. 2, line 55, "FIG. 6" should be -- FIGS. 6A-B --; Col. 2, line 65, "FIG. 10" should be -- FIGS. 10A-B --; Col. 5, line 16, "FIG. 5" should be -- FIGS. 5A-D --; Col. 5, line 39, "FIG. 6" should be -- FIGS. 6A-B --; Col. 8, line 54, "FIG. 10" should be -- FIGS. 10A-B --.

Signed and Sealed this

Twenty-fifth Day of June, 1996

Attest:

BRUCE LEHMAN

*Attesting Officer*     *Commissioner of Patents and Trademarks*